(No Model.)

K. F. TAYLOR.
VEGETABLE MASHER.

No. 456,863. Patented July 28, 1891.

WITNESSES:
F. McArdle.
E. M. Clark.

INVENTOR:
K. F. Taylor
BY Munn & Co.
ATTORNEYS

UNITED STATES PATENT OFFICE.

KATE F. TAYLOR, OF SMETHPORT, PENNSYLVANIA.

VEGETABLE-MASHER.

SPECIFICATION forming part of Letters Patent No. 456,863, dated July 28, 1891.

Application filed March 28, 1891. Serial No. 386,826. (No model.)

*To all whom it may concern:*

Be it known that I, KATE F. TAYLOR, of Smethport, in the county of McKean and State of Pennsylvania, have invented a new and Improved Vegetable-Masher, of which the following is a full, clear, and exact description.

My invention relates to improvements in vegetable-mashers; and the object of my invention is to produce a simple and convenient device in which the vegetables may be cooked and which will mash them smoothly and quickly after they are cooked.

To this end my invention consists in certain features of construction and combinations of parts, which will be hereinafter described and claimed.

Reference is to be had to the accompanying drawings, forming a part of this specification, in which similar figures of reference indicate corresponding parts in both views.

Figure 1:
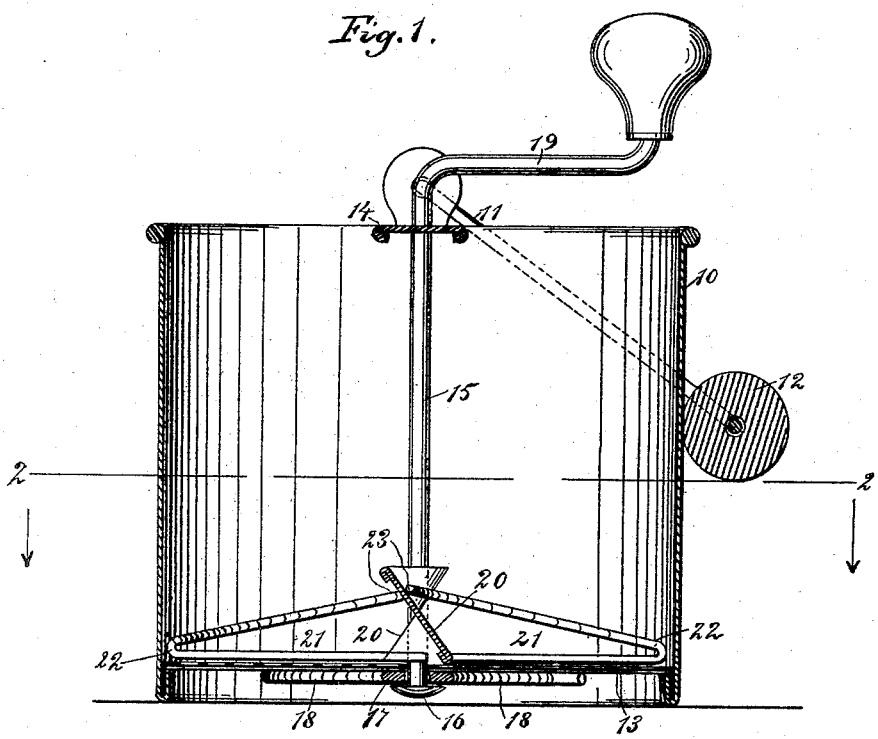
Figure 2:
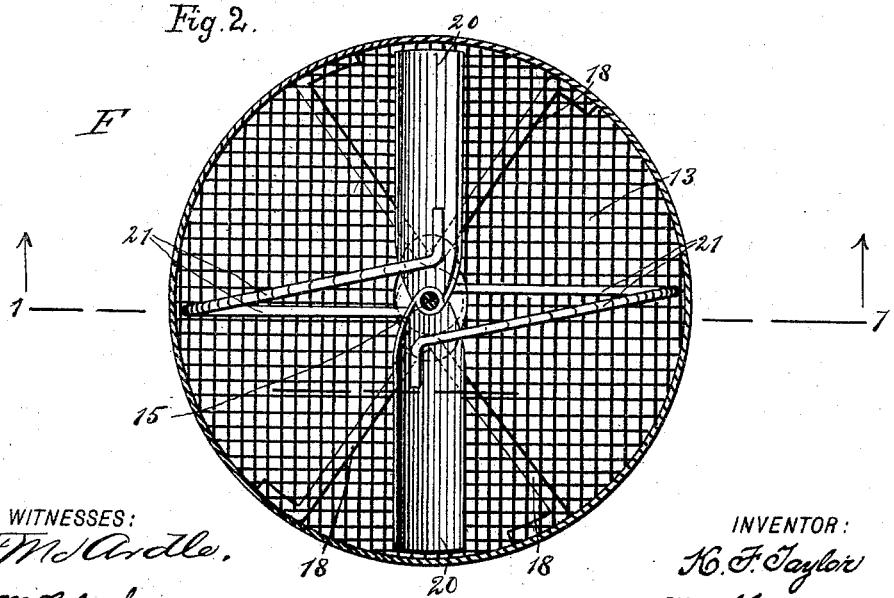

Figure 1 is a vertical section of the device on the line 1 1 in Fig. 2, and Fig. 2 is a sectional plan on the line 2 2 in Fig. 1.

The body of the masher consists of a cylinder 10, which is open at the top, is provided with a bail 11 and handle 12, and is partially closed at the bottom by a sieve 13. A cross-bar 14 extends across the top of the body, and in this cross-bar is mounted a vertical rod 15, the lower end of which extends through the sieve and terminates in a button 16, which prevents the displacement of the rod, and the button is arranged beneath a support 17, which serves to steady the rod, and the support 17 is formed on the inner ends of the arms 18, the outer ends of the arms being secured to the body 10. The upper end of the rod 15 is formed into a crank 19, by means of which the rod may be turned. Near the lower end of the rod 15 is a blade 20, which is secured to the rod, and which is composed of flat metal doubled over at the upper and lower edges. The blade 20 is inclined in opposite directions on each side of the rod 15, so that when the rod is turned the inclines of the blade will have a tendency to ride over the vegetables and mash them between the lower edge of the blade and the sieve. On each side of the blade 20 and at right angles to the same are rods 21, which rub against the sieve, and which extend to the body of the masher and are doubled upon themselves at 22, and then bend inward and terminate at 23, at which point they are secured to the upper portion of the blade 20. It will thus be seen that the rods 21 and the blade 20, being arranged at right angles, will form four radially-extending rubbers, which will all bear simultaneously upon the sieve 13.

The vegetables which are to be mashed in the masher are placed therein and the rod 15 rapidly rotated by means of the crank 19, and the rods 21 and blade 20 will mash the vegetables finely and force them through the sieve 13. If desired, the vegetables may be placed in the masher in a raw state, and the masher may then be placed in a kettle of boiling water, so that the vegetables will be boiled within it, and when the masher is lifted from the water the vegetables will be quickly and thoroughly drained.

The masher is especially adapted for mashing potatoes, as it will rub them as smooth as cream; but it is obvious that any kind of vegetables may be quickly mashed by it.

Having thus described my invention, I claim as new and desire to secure by Letters Patent—

1. A vegetable-masher comprising a cylindrical body having a sieve in the bottom and a cross-bar at the top, a handled rod extending downward through the cross-bar and having its lower end held in a suitable support, a blade secured to the rod and adapted to press upon the sieve, said blade having its ends oppositely inclined, and rods arranged at right angles to the blade and adapted to press upon the sieve, substantially as described.

2. In a vegetable-masher, the combination, with a cylindrical vessel having a sieve in its bottom, of a handle-rod mounted in the vessel, a blade secured to the lower end of the rod and inclined in opposite directions on each side of the said rod, and rods projecting at right angles from the lower portion of the blade extending nearly to the side of the vessel, then doubled upon themselves, and secured to the upper portion of the blade, substantially as described.

3. In a vegetable-masher, the combination, with a vessel having a sieve in its bottom, of a support below the sieve and provided with arms extending to the vessel, a cross-bar at the top of the vessel, a handle-rod mounted in said bar and support, and radially-extending rubbers secured to the lower end of the handle-rod, substantially as shown and described.

KATE F. TAYLOR.

Witnesses:
 JOHN N. APPLE,
 HAMILTON T. HILL.